United States Patent [19]

Hughes et al.

[11] 4,337,574
[45] Jul. 6, 1982

[54] METHOD OF MANUFACTURING ELECTRICAL CONNECTOR RECEPTACLES

[75] Inventors: Donald W. K. Hughes, Mechanicsburg, Pa.; John H. F. Lauterbach, Clearwater, Fla.

[73] Assignee: AMP Incorporated, Harrisburg, Pa.

[21] Appl. No.: 200,113

[22] Filed: Oct. 24, 1980

Related U.S. Application Data

[62] Division of Ser. No. 969,504, Dec. 14, 1978, Pat. No. 4,231,628.

[51] Int. Cl.³ .............................................. H01R 43/00
[52] U.S. Cl. ........................................ 29/883; 29/884; 264/272.11; 264/275; 264/277
[58] Field of Search ................... 264/272.11, 275, 277; 29/883, 884

[56] References Cited

U.S. PATENT DOCUMENTS

| | | | |
|---|---|---|---|
| 3,574,929 | 4/1971 | Michik | 264/272.14 X |
| 3,850,497 | 11/1974 | Krumreich et al. | |
| 3,954,320 | 5/1976 | Hardesty | |
| 4,054,354 | 10/1977 | Unger | 339/119 R X |
| 4,186,988 | 2/1980 | Kobler | 339/17 C X |
| 4,221,458 | 9/1980 | Hughes et al. | 339/176 MP X |

FOREIGN PATENT DOCUMENTS

782000 8/1957 United Kingdom ............... 264/277
855908 12/1960 United Kingdom ........... 264/272.11

*Primary Examiner*—Francis S. Husar
*Assistant Examiner*—Carl J. Arbes
*Attorney, Agent, or Firm*—Frederick W. Raring

[57] ABSTRACT

A method of manufacturing an electrical connector of the telephone jack type by insert molding, is disclosed. The conductors for the connector jack are first stamped and formed in continuous strip form from conductive sheet metal with the continuous strip having groups of conductors extending therefrom and spaced along the length of the strip. The strip is fed to an injection molding apparatus and the leading set of conductors of the strip is clamped in the mold of the apparatus in a manner such that the contact portions of the conductors are held between core pins. These core pins extend into the mold cavity so that when the plastic material fills the mold, intermediate portions of the conductors will be embedded in the molding material. When the mold is opened, the core pins are withdrawn from the cavity, the core pins having formed the plug-receiving opening in the telephone jack.

4 Claims, 10 Drawing Figures

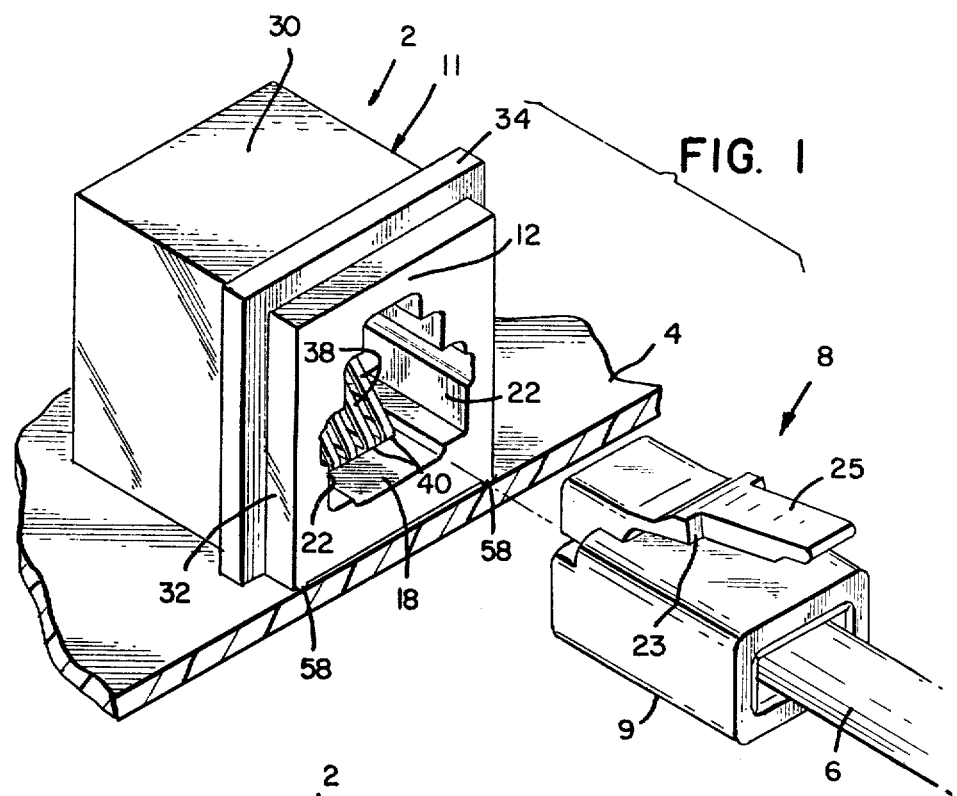
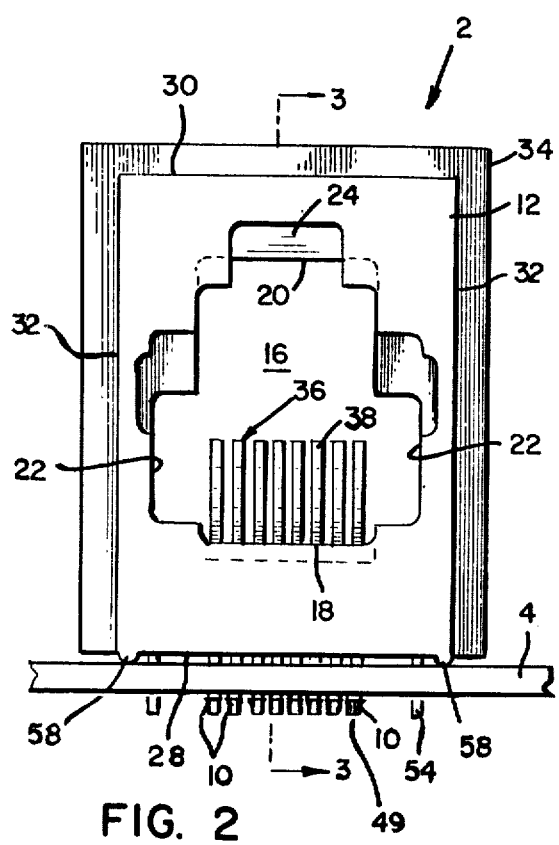
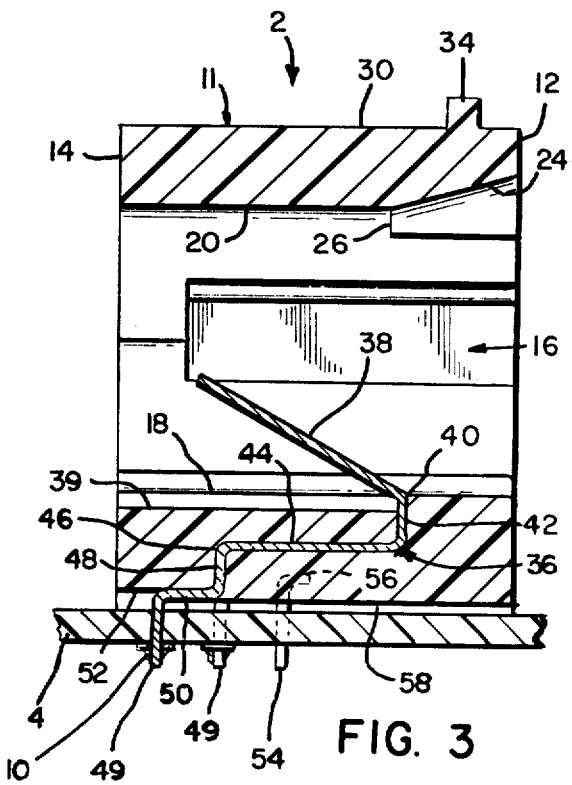
FIG. 1
FIG. 2
FIG. 3

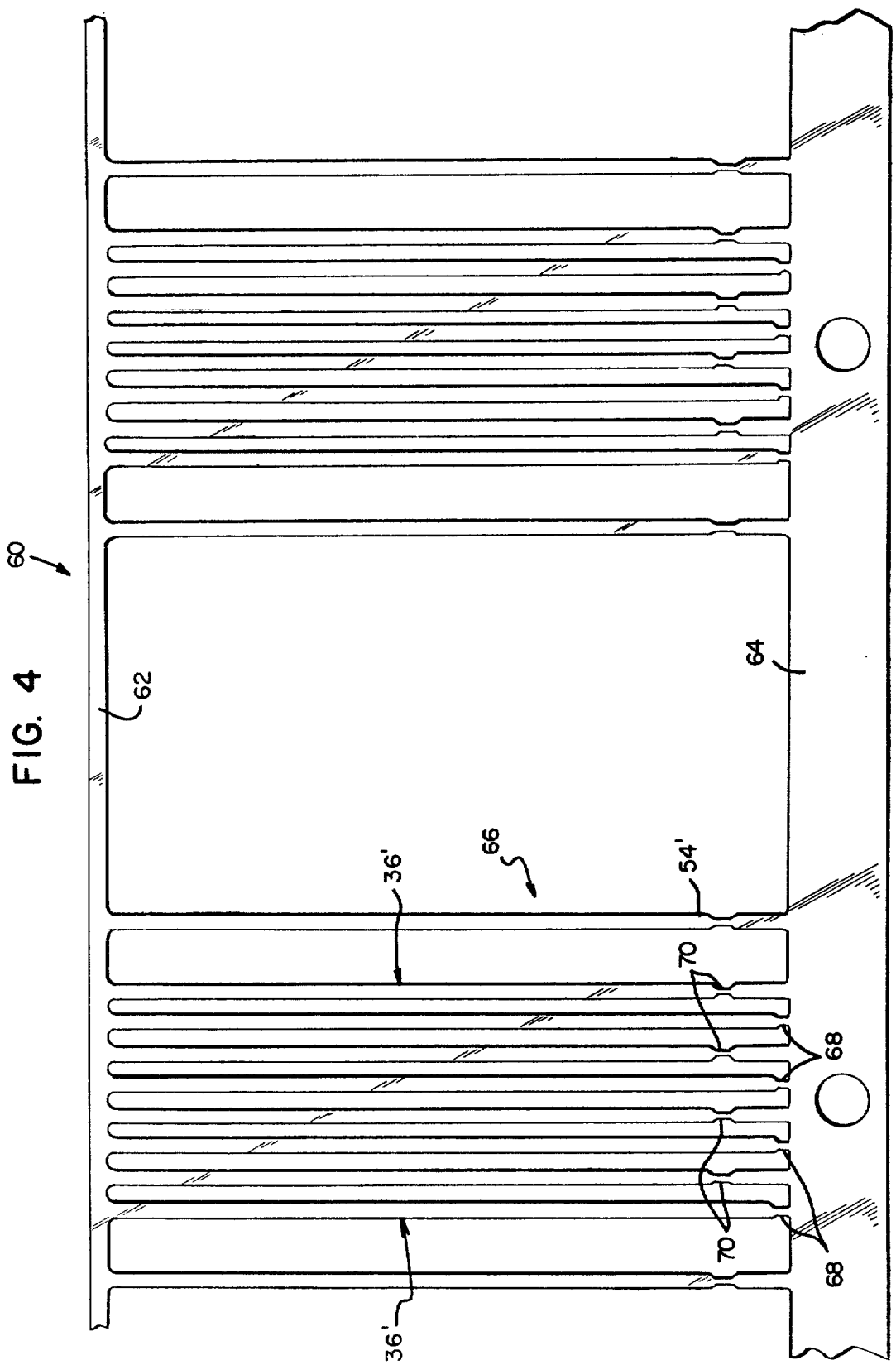

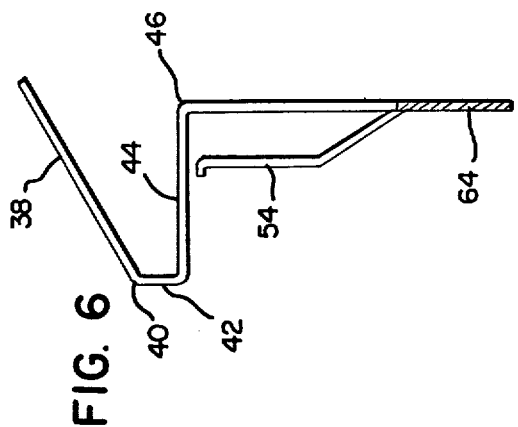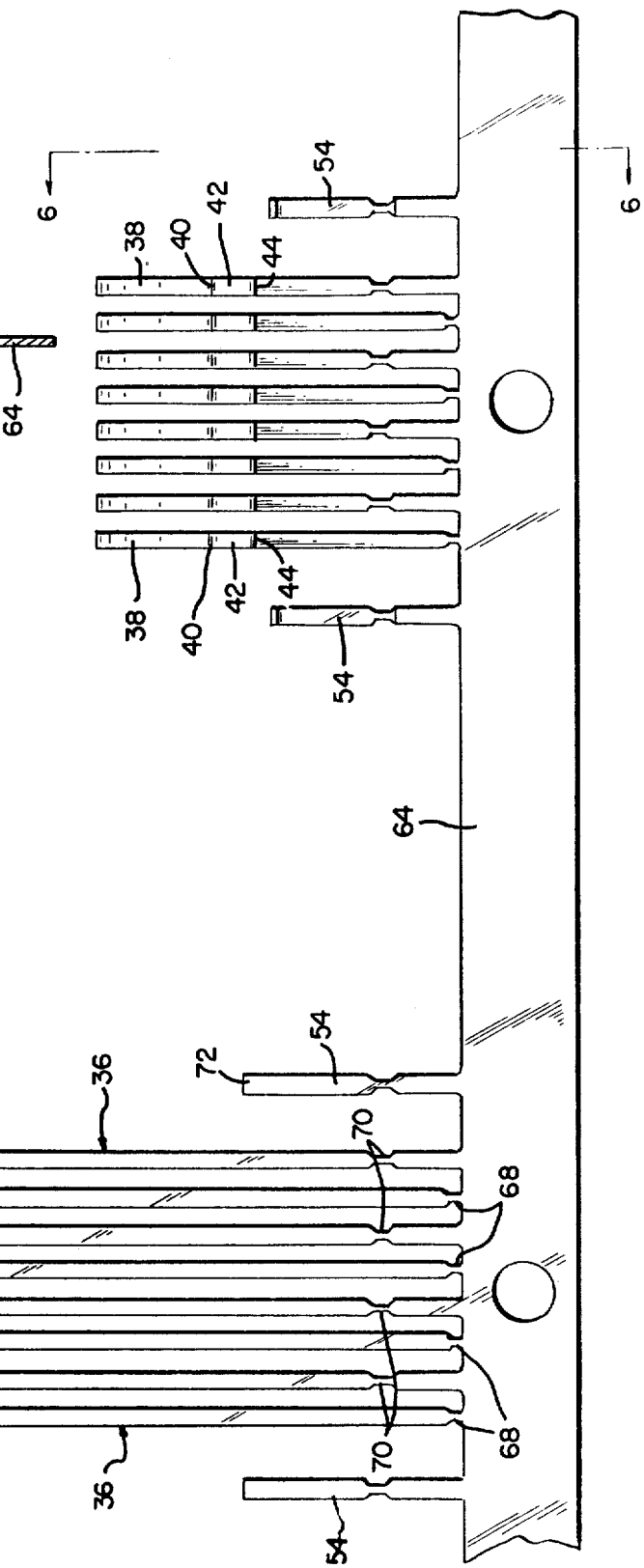

METHOD OF MANUFACTURING ELECTRICAL CONNECTOR RECEPTACLES

This is a division of application Ser. No. 969,504 filed Dec. 14, 1978, now U.S. Pat. No. 4,231,628, issued Nov. 4, 1980.

DESCRIPTION

1. Field of the Invention

This invention relates to electrical connector receptacles of the type which are intended to receive connector plugs. Connector receptacles of this general class are described in detail in U.S. Pat. No. 3,850,497.

2. BACKGROUND OF THE INVENTION

U.S. Pat. No. 3,850,497 described in detail a connector receptacle of a type which is intended for use in the telephone industry. The receptacle described in this patent comprises an insulating housing having a plug receiving end and a plug-receivingopening extending into the plug-receiving end. A plurality of circular openings extend through the housing from the plug-receiving end to the rearward end of the housing and contact springs extending from these circular openings diagonally into the plug-receiving opening so that when a plug is inserted into the receptacle, the contact members on the plug will engage the contact springs. The contact springs are in the form of wires and are connected by means of crimped electrical connections to lead wires. These crimped connections are contained in the circular openings in the housing and the lead wires extend from the circular openings and away from the housing at the rearward end thereof. The commonly used type of connector plug which is intended to be mated with connector receptacles of the type described above is described in U.S. Pat. No. 3,954,320.

The connector receptacle described in U.S. Pat. No. 3,850,497 has been widely adopted in the telephone industry and it is being used to an increasing extent on equipment other than telephone equipment, for example, data processing equipment which may be installed adjacent to a telephone exchange, small computers, and similar equipment. The use of these connector receptacles in such related equipment often requires that the receptacle be mounted on a circuit board, but the connector receptacle shown in U.S. Pat. No. 3,850,497 cannot be readily or easily connected to conductors on a circuit board.

Commonly assigned application Ser. No. 940,536 and now U.S. Pat. No. 4,221,458 discloses and claims a connector receptacle of the general class which is disclosed in U.S. Pat. No. 3,850,497, and which is dimensioned to receive a connector plug as described in U.S. Pat. No. 3,954,320. The receptacle disclosed in application Ser. No. 940,536 has stamped and formed electrical conductors therein rather than the wire type conductors of U.S. Pat. No. 3,850,497 and one end of each stamped and formed conductor extends beyond the housing of the connector so that the connector can be mounted on a circuit board with the ends of the conductors extending into openings in the circuit board. These ends of the conductors can then be soldered to conductors on the circuit board in the usual manner. The stamped and formed conductors shown in application Ser. No. 940,536 are assembled to the connector housing by insertion of intermediate portions of the conductors into side-by-side depressions or channels in one of the external sidewalls of the housing. One end of each conductor is reversely bent so that it extends into the plug-receiving opening and these ends serve as contact springs which are contacted by contact members in an inserted plug.

It would be desirable under some circumstances to have the intermediate portions of the conductors completely enclosed in the housing rather than inserted into channels in the external surface of the housing. The inserted conductors are highly satisfactory for many circumstances of use but there are some circumstances where enclosed connectors would be preferred in order to achieve improved dielectric characteristics and to protect the conductors from the atmosphere or from foreign matter such as dust particles. There are also circumstances under which it would be desirable to provide non-current carrying metallic posts in the external sidewall of the housing for soldering to metallized surface portions of the circuit board in order to permit mounting of the housing on the circuit board securely independently of the mechanical connection which is achieved by the soldered conductors. This requirement exists in critical applications and/or when the receptacle is mounted on a circuit board under circumstances such that the housing might be subjected to abusive handling.

The present invention is directed to the achievement of a connector receptacle of the general class described in U.S. Pat. No. 3,850,497 which all satisfy the requirements of completely enclosed conductors in the housing and metallic mounting posts for securing the housing to the circuit board. The invention is also directed to the achievement of an improved manufacturing process for producing receptacles which satisfy these same requirements.

A preferred embodiment of the invention comprises an insulating housing having side-by-side conductors insert-molded in wall portions of the housing, the wall portions being between one of the internal sidewalls of the plug-receiving opening and the adjacent external sidewall. First end portions of the conductors emerge from the internal sidewall at a location adjacent to the plug-receiving end of the housing, extend diagonally into the opening, and serve as contact springs. The other ends of the conductors emerge from the adjacent external sidewall and may extend normally from this sidewall or normally from the rearward end of the housing depending upon the intended orientation of the housing on a circuit board. Metallic mounting posts are also imbedded in the housing and extend from the adjacent external sidewall at locations proximate to the external endwalls so that the ends of the conductors are between the mounting posts. When the housing is mounted on a circuit board with the ends of the conductors soldered to conductors on the circuit board and with the ends of the mounting posts soldered to metallized (but non-current carrying) areas on the circuit board, the mounting posts serve to protect the soldered conductors against lateral forces which might be otherwise transmitted to the soldered conductors when the housing is subjected to applied external forces, as by handling or otherwise.

The connector receptacle is manufactured by producing a continuous strip comprising spaced-apart carrier strips and transversely extending conductors and mounting post blanks at regularly spaced intervals. This strip is continuous fed into a forming press in which the conductors and the mounting posts are formed by forming dies into their final shape. The strip is then fed from the forming press into an injection molding apparatus in which the housing is molded onto the strip so that a continuous strip of housings is produced by the molding apparatus. The individual housings may be severed from this strip or the housings may be maintained in strip form in order to facilitate further processing such as insertion by automatic machinery into circuit boards.

DESCRIPTION OF THE DRAWINGS

FIG. 1 is a perspective view of a connector receptacle in accordance with the invention mounted on a circuit board and showing a connector plug in alignment with the plug-receiving opening in the connector receptacle.

FIG. 2 is a frontal view of the connector receptacle.

FIG. 3 is a sectional side view taken along the lines 3—3 of FIG. 2.

FIG. 4 is a plan view of a section of continuous sheet metal strip of conductors and mounting post blanks.

FIG. 5 is a plan view of the strip illustrating shearing and forming operations which are performed on the strip prior to molding of the receptacle housing.

FIG. 6 is a view taken along the lines 6—6 of FIG. 5 showing the profile of the strip.

PRACTICE OF THE INVENTION

Figure 7:
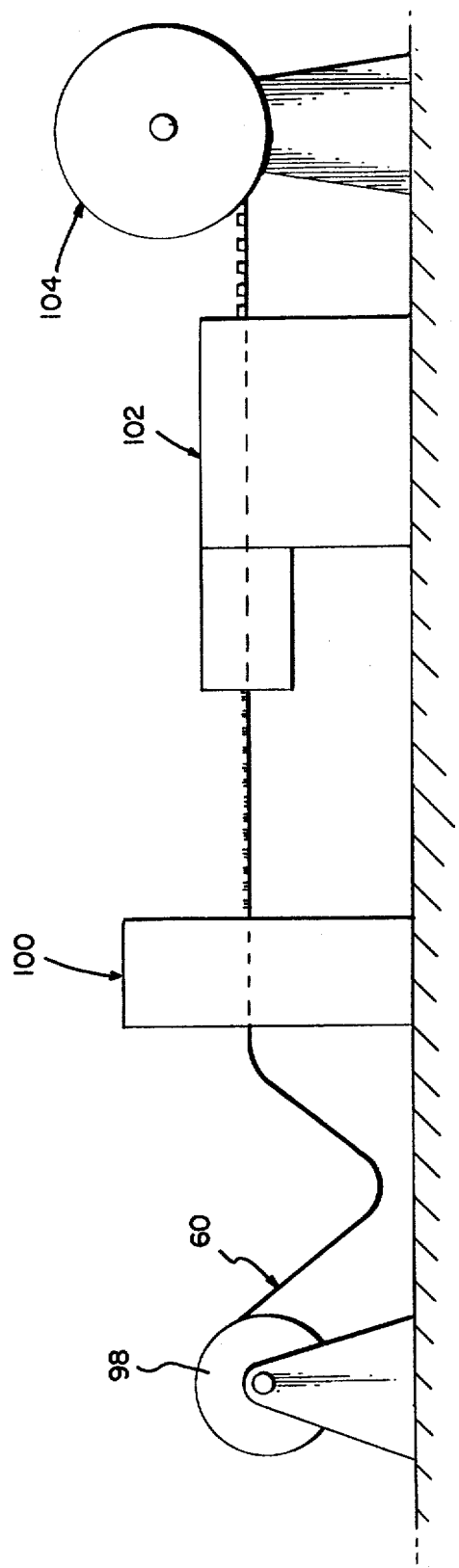
FIG. 7 is a diagrammatic view illustrating one manufacturing process for producing connector receptacles.

FIG.1 shows a connector receptacle 2 in accordance with the invention mounted on a circuit board 4 and serving to provide connections between conductors in a cable 6 and conductors 10 on the underside of the circuit board. The cable 6 has a plug 8 on its end of the general type described in U.S. Pat. No. 3,954,320. As explained in U.S. Pat. No. 3,954,320, the conductors in the cable 6 are electrically connected to spaced-apart terminals in the plug. The terminals have edge portions which are exposed on the underside 9 of the plug so that when the plug is inserted into the receptacle, these edge portions of the terminals in the plug will engage spring contacts in the connector receptacle 2.

The receptacle 2 comprises an insulating housing 11 having a plug-receiving end 12, a rearward end 14, and having a plug-receiving opening 16 which extends from the plug-receiving end to the rearward end. This opening is contoured to receive the plug as will be apparent from an inspection of FIG. 1.

The opening 16 has lower and upper internal sidewalls 18, 20 and internal endwalls 22. A centrally located ramp 24 is provided in the upper sidewall 20 to provide clearance for the leading end of the plug 8 and shoulders 26 are provided on each side of this ramp adjacent to the endwalls 22. These shoulders cooperate with shoulders 23 on a latch arm 25 of the plug to retain the plug in the opening after insertion.

The housing has lower and upper external sidewalls 28, 30 and external endwalls 32. A continuous flange 34 is provided on the endwalls 32 and the upper sidewall 30 adjacent to the mating end 12. This flange is intended to bear against the surface of a panel when the receptacle is mounted on a circuit board and where a panel extends normally of the surface of the circuit board.

A plurality of side-by-side spaced-apart stamped and formed conductors 36 are imbedded in the housing and have first end portions 38 which emerge from the internal sidewall 18 as shown at 40 at a location adjacent to, but spaced from, the mating end 12. The first end portions 38 of these conductors extend diagonally from sidewall 18 away from this sidewall and towards the rearward end of the housing. These first ends 38 serve as spring contacts and are flexed downwardly and enter side-by-side recesses 39 in the sidewall 18 when the plug is inserted into the opening.

Intermediate portions 42, 44 of each conductor 36 are imbedded in the housing between the internal and external sidewalls 18, 28. These intermediate portions extend downwardly as shown at 42 from the sidewall 18 and then rearwardly as shown at 44 towards the rearward end 14 of the housing. Each conductor is bent downwardly at 46, extends downwardly in the housing as shown at 48 and emerges from the external sidewall 28 to provide an exposed end 49 which is intended for soldering to a conductor on the circuit board 4. The ends 49 are staggered as shown by bending every other conductor rearwardly as shown at 50, recesses 52 being provided in the sidewall 28 for these bent portions. The projecting ends 49 of the conductors thus all extend normally from the sidewall 28 but are staggered with reference to each other.

Non-current carrying metallic mounting and supporting posts 54 are imbedded in the housing adjacent to the external endwall 32 so that the ends 49 of the conductors are between the mounting posts 54. Each mounting post has a rightwardly formed, as viewed in the drawing, upper end 56 imbedded in the housing to ensure that it will be firmly held therein. The lower external sidewall 28 also has integral standoff ribs 58 which support the housing above the surface of the circuit board during soldering, thereby to prevent flow of solder onto the upper surface of the board.

Referring now to FIGS. 4–10, receptacles 2 in accordance with the invention are manufactured by first producing a stamped continuous strip 60 comprising spaced-apart parallel carrier strips 62, 64 having at periodic intervals transversely extending groups 66 of conductor blanks 36' and support post blanks 54' with the spacing between adjacent conductor blanks 36' being the same as the spacing between the conductors 36 in the connector receptacle. The support post blanks 54' are also spaced from the immediately adjacent conductor blanks 36' by the same distance as that which exists in the connector. The conductor blanks 36' may be left flat or they might be formed to a slightly arcuate cross-section, if desired. Alternate conductor blanks 36' have relatively narrow neck portions 70 which are adjacent to, but spaced from, the carrier strip 64 and the remaining conductor blanks have neck portions 68 which are immediately adjacent to the carrier strip 64. During manufacture, the conductors are severed from the carrier strip 64 at these neck portions and since two different lengths of conductors are required in the connector, by reason of the offset relationship of the ends 49 of the conductors, the necks 68, 70 are at different locations relative to the carrier strip 64. The support post blanks 54' also have reduced width necks as shown and these blanks are severed from the carrier strip at these neck portions.

Figure 10:
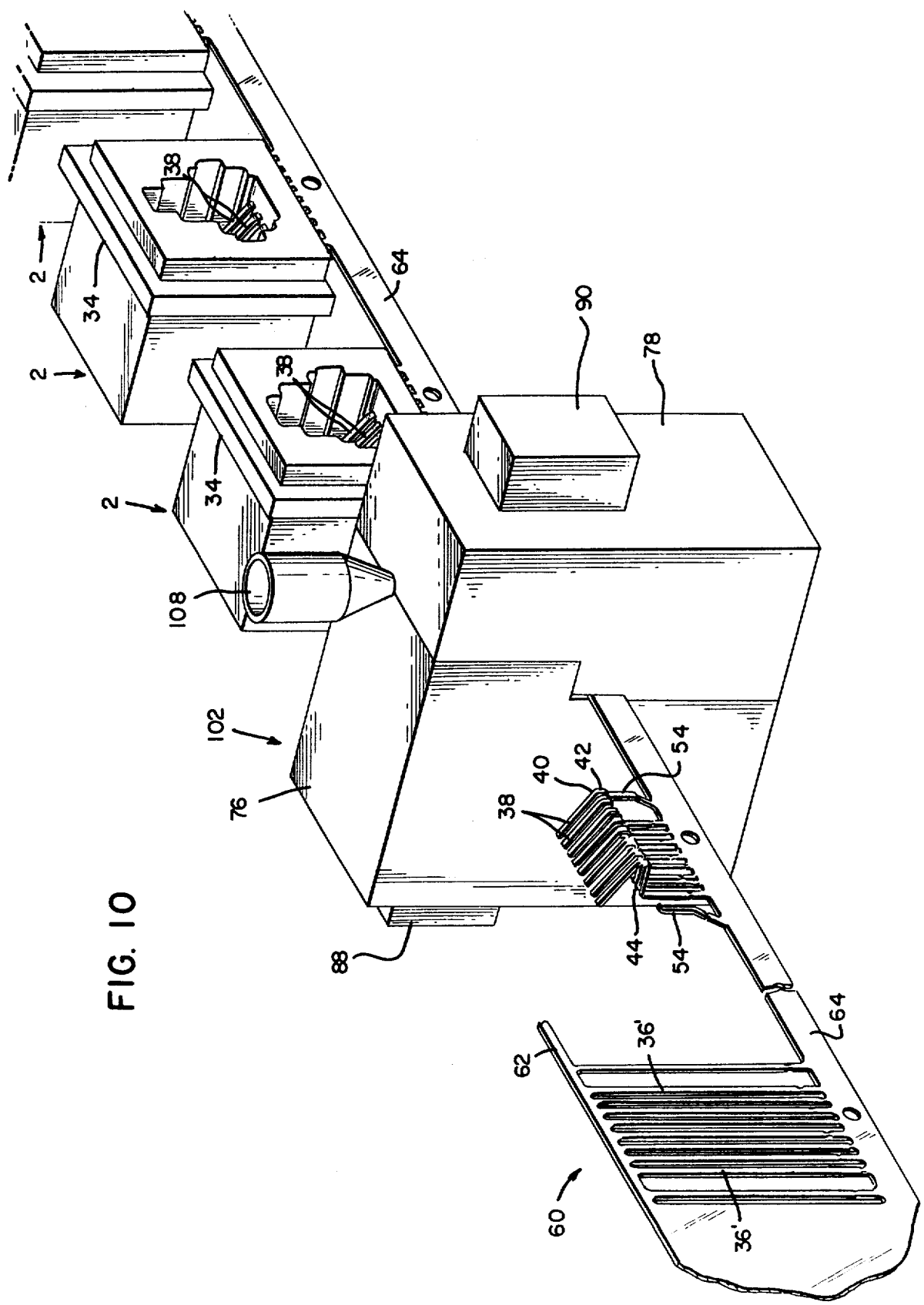
FIG. 10 is a perspective view illustrating the manner in which the insulating housings are molded onto the terminal strip.

When connectors are manufactured by the method illustrated in the diagrammatic view of FIGS. 7 and 10, the flat strip of FIG. 4 is produced in a first stamping operation, wound on a reel 98, and transported to the location at which the housings are molded onto the strip 60. The strip 60 is fed through a forming press diagrammatically illustrated at 100 in which the carrier strip 62 is severed from the ends of the conductor blanks 36' and the support post blanks 54' are severed as shown at 72 at locations spaced from the carrier strip 64. After the severing operation has been carried out in the forming press 100, the conductor blanks 36' and the support post blanks 54' are formed to their final profile as shown in FIG. 6 with the carrier strip 64 integral with the lower ends of the formed conductors and support posts. The support posts are offset from the plane of the carrier strip 64 as shown in FIG. 6. The carrier strip 64 in its final form thus has a plurality of groups of conductors 36 extending therefrom at spaced intervals, each group containing the number of conductors required for a single connector receptacle along with the associated support posts 54.

Figure 8:
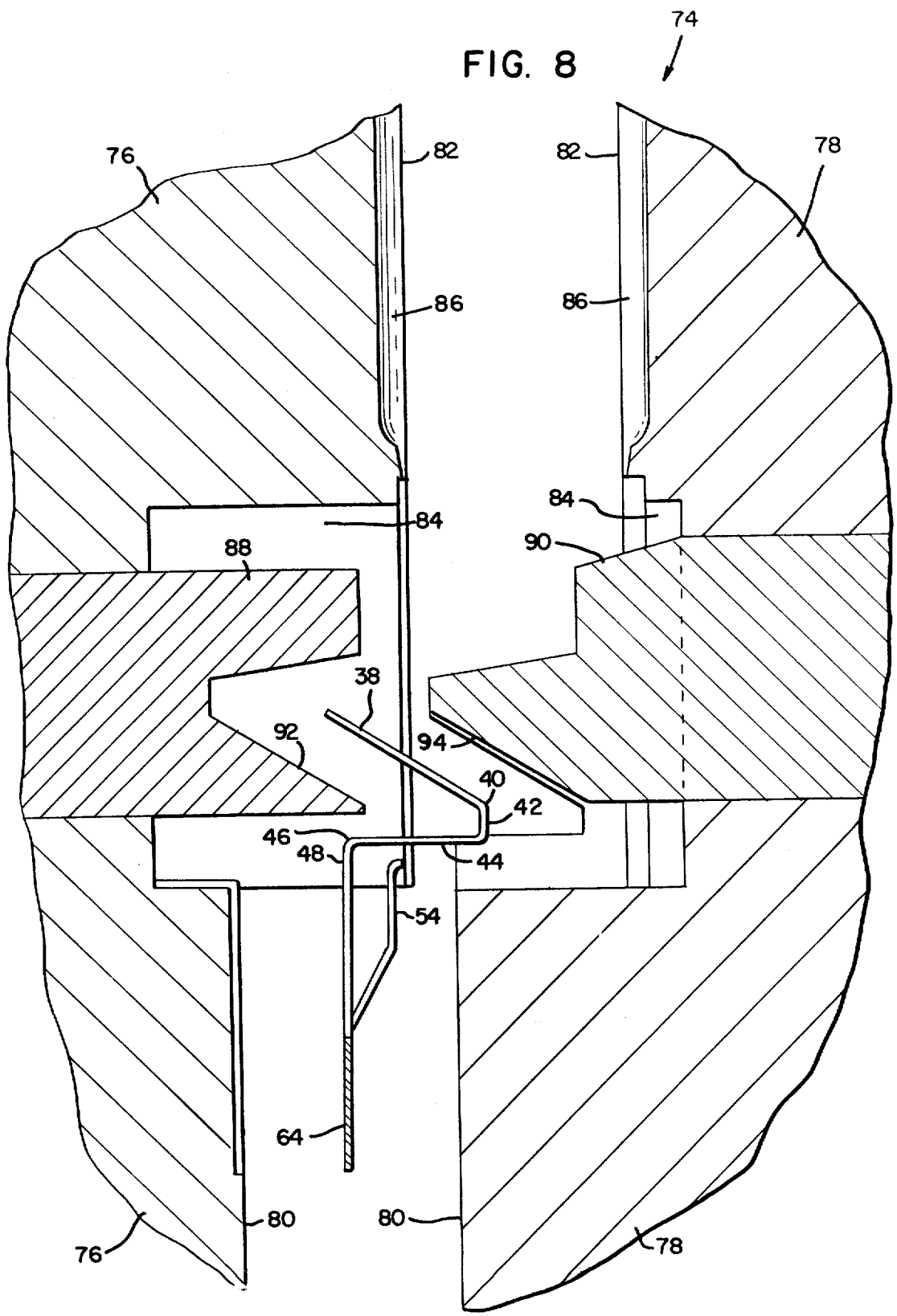
FIG. 8 is a fragmentary cross-sectional view of the two parts of a mold for producing housings by injection molding, this view showing the mold parts in their open condition.
Figure 9:
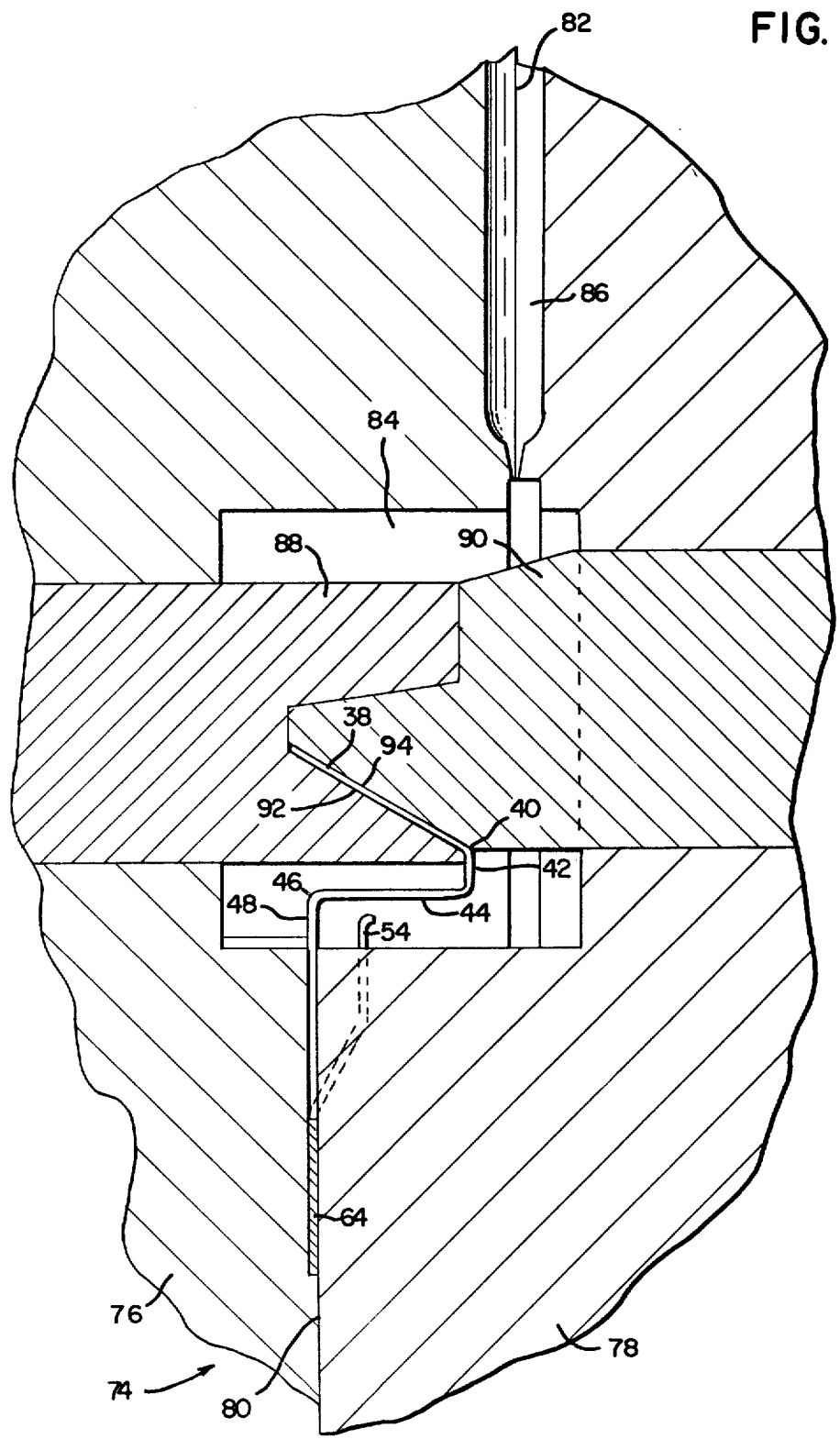
FIG. 9 is a view similar to FIG. 8 but with the mold parts closed.

Thereafter, the strip is fed to a molding machine 102 and the housings are molded onto the strip in a mold shown in FIGS. 8–10. The mold 74 comprises two parts 76, 78 which are movable from their open position, FIG. 8, to their closed positions, FIGS. 9 and 10, in which their opposed sufaces are against each other along parting lines 80, 82. The opposed faces have recesses which define a mold cavity 84 which conforms to the connector housing and a sprue 86 extends to this cavity through which the thermoplastic material is injected into the cavity. Molding material is injected into the sprue by a nozzle 6' of a suitable molding machine.

Core pins 88, 90 mounted in the mold parts 76, 78, respectively, extend into the cavity and engage each other when the mold parts are closed as shown in FIG. 9. The opposed surfaces of the core pins are inclined as shown at 90, 92 and have recesses which receive the ends 38 of the conductors so that the intermediate portions of the conductor 42, 44, 48 extend through the cavity below the core pins and downwardly as viewed in the FIG. 9, along the parting line 80. The parting line has a recess for reception of these lower portions of the conductors and the carrier strip. The mold parts are also contoured at the parting line such that the offset mounting posts 54, which are integral with the carrier strip 64 at this stage of the manufacturing process will be clamped as shown in FIG. 9 in offset relationship to the plane defined by the lower portions of the conductors and the carrier strip 64.

Strip feeding means are provided for advancing the strip during each molding cycle by an amount such that a group of conductors and its associated mounting posts will be located between the mold parts 76, 78 after feeding so that when the mold parts are closed, the conductors and the mounting posts will be precisely positioned in the mold cavity and the contact spring portions of the conductors will be held between the surfaces 90, 92 of the core pins as shown in FIG. 9. The molding material is then injected into the cavity through the sprue 82, the mold parts are moved to their open position, and the strip is advanced. The housings may be molded of any suitable thermoplastic material such as a polycarbonate, or a filled nylon material.

If desired, the continuous strip comprising the carrier strip 64 having the housings molded thereon at spaced intervals may be maintained as a strip and wound on a reel 104 for further processing, such as insertion into circuit boards by automatic machinery. The offset ends 49 would then be bent into grooves 52 at the time of insertion. Alternatively, the individual connector receptacles can be severed from the strip by shearing the conductors and the offset mounting posts 54 from the carrier strip and bending the offset ends 49.

Connector receptacles, in accordance with the invention, are characterized by the fact that the intermediate portions of the conductors 42, 44 are totally imbedded in the housing and are thereby protected from the atmosphere or from damage during handling. Furthermore, the mating end 12 of the housing may have a flat surface completely surrounding the plug-receiving opening 16 rather than, as with previous receptacles of the general class, a recess extending to the reversely formed portions 42 of the conductors. These features render receptacles in accordance with the invention extremely durable and well-suited for use in critical applications where they must be protected against damage. It will be apparent from FIG. 2 that the soldered connections between the ends of the conductors and the receptacle and the conductors on the circuit board are protected by the soldered connections between the mounting posts 54 and the metallized portions of the circuit board. Should a lateral force be applied to the housing as shown in FIG. 2, tending to rock the housing relative to the circuit board, the effects of this force will be absorbed by the mounting post 54 and will not be transmitted to the soldered electrical connections between the conductors and the circuit board conductors.

What is claimed:

1. A method of making electrical connector receptacles of the type comprising an insulating housing havng a plug-receiving end and a rearward end, a plug-receiving opening extending into said plug-receiving end, said opening having opposed internal sidewalls and opposed internal endwalls, said housing having oppositely directed external sidewalls and oppositely directed external endwalls, a plurality of electrical conductors with each of said conductors having an intermediate portion in side-by-side spaced-apart relationship, each of said conductors comprising a first end which serves as a contact spring extending from one of said internal sidewalls diagonally into said opening and towards said rearward end, an intermediate portion extending from said plug-receiving end through said housing between said one internal sidewall and the adjacent external sidewall and towards said rearward end, and a second end which extends externally of said housing, said plug-receiving opening being dimensioned to receive a connector plug having spaced-apart contact members therein which engage said contact springs, said method comprising the steps of:

stamping a continuous strip of conductive sheet metal to produce a continuous strip comprising a carrier strip having groups of blanks for said conductors extending therefrom at spaced intervals with the number of conductor blanks in each group being equal to the number of conductors in said connector receptacle, feeding said strip through a forming die and forming said conductor blanks to the shape of said conductors in said connector receptacle, intermittently feeding said strip to a molding apparatus having a mold cavity which conforms to the shape of said housing and having core pins in said mold cavity which conform to the shape of said plug-receiving opening, positioning one of said groups of formed conductors in said cavity with said contact portions of said conductors held between said core pins, injecting molding material into said cavity, opening said mold, and feeding said strip whereby, said strip, when it emerges from said mold, has connector housings molded on each of said groups of conductors with molding material surrounding said intermediate portions of said conductors.

2. The method set forth in claim 1 including the step of severing said conductors from said carrier strip after said strip is fed from said mold.

3. The method set forth in claim 1, said connector receptacles each having two metallic mounting posts extending from said housing with said second ends of said conductors being between said mounting posts, said method including the steps of forming two mounting post blanks for each of said groups of conductors during stamping of said strip with said conductor blanks of each group between said mounting post blanks.

4. A method of making electrical connector receptacles of the type comprising an insulating housing having a plug-receiving end and a rearward end, a plug-receiving opening extending into said plug-receiving end, said opening having opposed internal sidewalls and opposed internal endwalls, said housing having oppositely directed external sidewalls and oppositely directed external endwalls, a plurality of electrical conductors having intermediate portions in side-by-side spaced-apart relationship, each of said conductors comprising a first end which serves as a contact spring extending from one of said internal sidewalls diagonally into said opening and towards said rearward end, an intermediate portion extending from said plug-receiving end through said housing between said one internal sidewall and the adjacent external sidewall and towards said rearward end, and a second end which extends externally of said housing, said plug-receiving opening being dimensioned to receive a connector plug having spaced-apart contact members therein which engage said contact springs, said method comprising the steps of:

stamping a continuous strip of conductive sheet metal to produce a continuous strip comprising a carrier strip having groups of blanks for said conductors extending therefrom at spaced intervals with the number of conductor blanks in each group being equal to the number of conductors in said connector receptacle, feeding said strip through a forming die and forming said conductor blanks to the shape of said conductors in said connector receptacle, intermittently feeding said strip to a molding apparatus comprising two mold parts which are movable against each other to form a mold cavity, each mold part having a core pin extending into the mold cavity, positioning one of said groups of conductors between said mold parts and clamping said first ends of said conductors between said core pins and clamping said carrier strip and said second ends of said conductors between said mold parts, injecting molding material into said cavity and thereby surrounding said intermediate portions of said each group of blanks, moving said mold parts away from each other, and feeding said strip to feed a molded housing on said strip from said molding apparatus.

* * * * *